Patented July 20, 1948

2,445,734

UNITED STATES PATENT OFFICE 2,445,734

DISPERSION OF ANTIOXIDANTS IN RUBBER LATEX

John C. Carl, Akron, Ohio, assignor to The Firestone Tire & Rubber Company, Akron, Ohio, a corporation of Ohio No Drawing. Application December 6, 1945, Serial No. 633,261

1 Claim. (Cl. 260—740)

This invention relates to the dispersion of antioxidants in rubber latex and includes both the process and the dispersions produced in carrying out the process.

Many antioxidants are easily dispersed in natural latex, such as, for example, crystalline antioxidants and resinous, brittle materials. The problem of dispersing amorphous nonfrangible compounds—that is, materials that cannot be ground in a ball mill or other suitable grinding device—has not heretofore been satisfactorily solved. Various attempts to produce permanent dispersions of such materials in a latex have met with failure. If solvent is used to dissolve the antioxidant, dispersion of the resulting solution in the latex destabilizes it, producing spots of colored coagula, etc. Premature coagulation may result if the latex is stored.

According to this invention such antioxidants are melted and mixed with a soap in the molten condition. This molten mass is then poured with vigorous agitation into a hot aqueous medium, preferably a hot aqueous solution which contains a dispersing agent. This hot mix is then added quickly to a relatively small amount of a rubber latex, which is preferably a concentrated latex. The latex may be a natural rubber latex or a latex of a synthetic rubber-like material. The amount of antioxidant added to the latex is preferably such as to produce a masterbatch of antioxidant-containing latex; i. e., a latex which contains at least twice as much antioxidant as is required for production of a cured product of satisfactory antioxidant content. Although ordinarily the antioxidant dispersion will be added to a latex of about 60 per cent concentration, other commercial concentrations of natural or synthetic rubber latices may be treated. Such a masterbatch of latex and antioxidant may be kept indefinitely before use. In using the masterbatch, it is mixed with a quantity of latex containing no antioxidant to bring the antioxidant content to the desired level.

The invention will be described more particularly as applied to the compounding in natural latex of the two antioxidants, 2,2,4-trimethyl-6-phenyl-1,2-dihydroquinoline (referred to herein as antioxidant A) and a physical mixture of 82 parts of antioxidant A and 18 parts of diphenyl para-phenylene diamine (referred to herein as antioxidant B).

The following illustrates the carrying out of the invention:

Six and seventy-five hundredths parts of antioxidant A and 23.25 parts of antioxidant B were melted together. Two and seven tenths parts triethanolamine and 3.75 parts oleic acid were added to the melted mixture. A 10 per cent solution of ammonium caseinate was then heated, and the molten mass was added to a portion of the hot solution equivalent to 3 parts of casein. This was done with vigorous agitation. Then sufficient hot water was added to the suspension to bring the antioxidant content down to 30 per cent, the agitation being maintained during the addition of the hot water. Both the casein solution and the water containing the antioxidant were at a temperature above 70° C. when mixed. This final water solution was immediately run through a colloid mill set at about 0.002 inch clearance. The resulting emulsion had to be used within a short time, or flocculation of the emulsion took place. It was found that the emulsion could be restored by reheating with agitation.

To produce a stable masterbatch, 1 part of the hot aqueous emusion was immediately added to 2 parts of natural latex of 60 per cent rubber content. The resulting masterbatch, which was found to be capable of indefinite storage without separation, contained about 40 parts rubber, 10 parts antioxidant, and 50 parts of aqueous solution. Working batches were obtainable by adding normal or concentrated latices to this masterbatch to bring the antioxidant to a desired percentage.

The details of producing the masterbatch may, of course, be varied. The concentration of the latex and the nature of the ingredients compounded with it control at least to some extent the nature of the variations which are possible. For example, in the above detailed procedure the soap used was triethanolamine oleate. Various other soaps may be used, such as potassium, ammonium or sodium oleate or stearate. Other ethanolamines, such as diethanolamine, tetraethanolamine, etc., may be employed as well as other amine soaps. The amount of soap may be varied, and probably as low as about 4 per cent on the final total aqueous emulsion will be found satisfactory. Larger quantities may be used although the use of any large excess is simply a waste of materials. The casein may be brought into solution as any suitable salt, such as the potassium, ammonium or sodium salt, for example. As low as 3 per cent of the casein on the total emulsion was found satisfactory. Probably smaller amounts could be used, and larger amounts would work. Other dispersing agents, such as soaps, etc., may replace the casein.

The process is not limited to the use of any specific range of proportions, and modifications in the proportions, reagents, etc., are possible within the scope of the invention.

What I claim is:

The method of producing a latex master batch which comprises melting together 6.75 parts of 2,2,4 - trimethyl-6-phenyl - 1,2 - dihydroquinoline and 23.25 parts diphenyl para-phenylene diamine, then adding a soap formed of .7 part of triethanolamine and 3.75 parts of oleic acid while keeping the mass molten, adding the resulting molten mass with violent agitation to a hot solution of ammonium caseinate containing the equivalent of 3 parts of casein, adding sufficient hot water at a temperature over 70° C. with agitation to the aforesaid aqueous mixture while at a temperature over 70° C. to reduce the content of the first two organic chemicals to 30 per cent, immediately running the mixture through a colloid mill, and adding the mixture to natural rubber latex of 60 per cent rubber content in the ratio 1:2.

JOHN C. CARL.

REFERENCES CITED

The following references are of record in the file of this patent:

UNITED STATES PATENTS

| Number | Name | Date |
|---|---|---|
| 1,977,211 | Schur | Oct. 16, 1934 |
| 2,064,728 | Calcott | Dec. 15, 1936 |
| 2,090,629 | Hiers et al. | Aug. 24, 1937 |
| 2,100,714 | Hiers | Nov. 30, 1937 |
| 2,326,984 | Tomlin | Aug. 17, 1943 |

FOREIGN PATENTS

| Number | Country | Date |
|---|---|---|
| 520,653 | Great Britain | Apr. 30, 1940 |